T & I. W. Ward.
Mower.

Nº 39,186.      Patented Jul. 7, 1863.

WITNESSES.

INVENTOR.
Thos Ward
Israel W. Ward
per Munn & Co
Attorneys

UNITED STATES PATENT OFFICE.

THOMAS WARD AND ISRAEL W. WARD, OF LANE DEPOT, ILLINOIS.

IMPROVEMENT IN HARVESTERS.

Specification forming part of Letters Patent No. 39,186, dated July 7, 1863.

*To all whom it may concern:*

Be it known that we, THOMAS WARD and ISRAEL W. WARD, of Lane Depot, in the county of Ogle and State of Illinois, have invented a new and Improved Harvester; and we do hereby declare that the following is a full, clear, and exact description of the same, reference being had to the accompanying drawings, making a part of this specification, in which—

Figure 1:
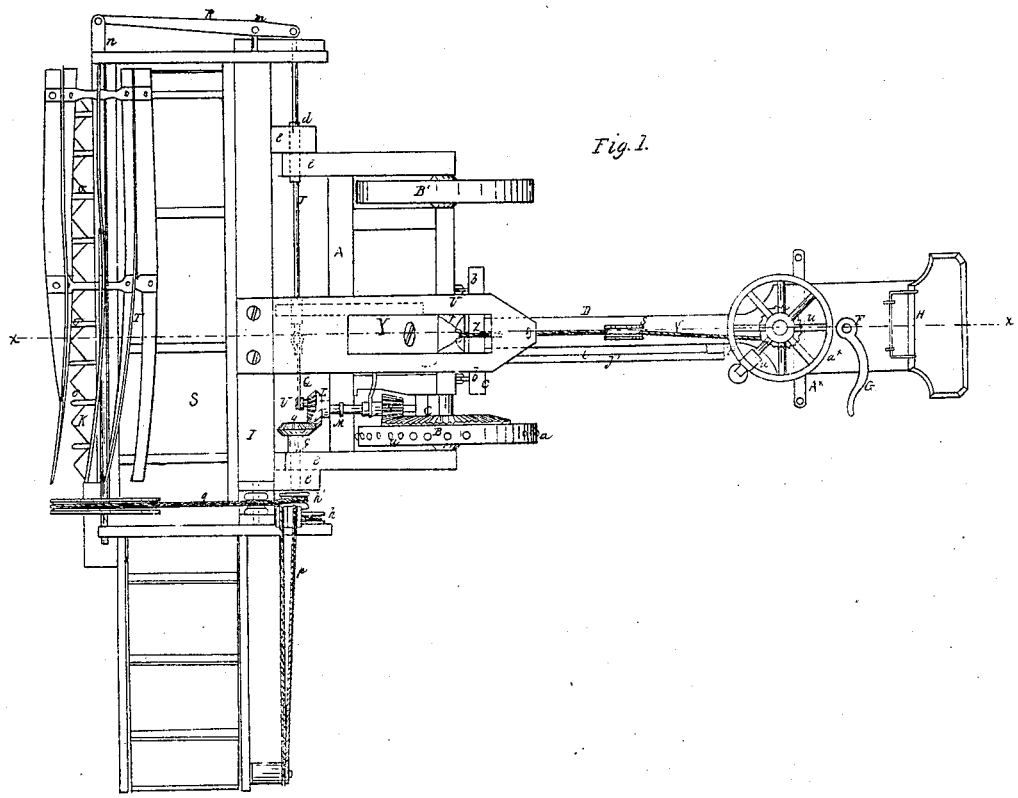
Figure 2:
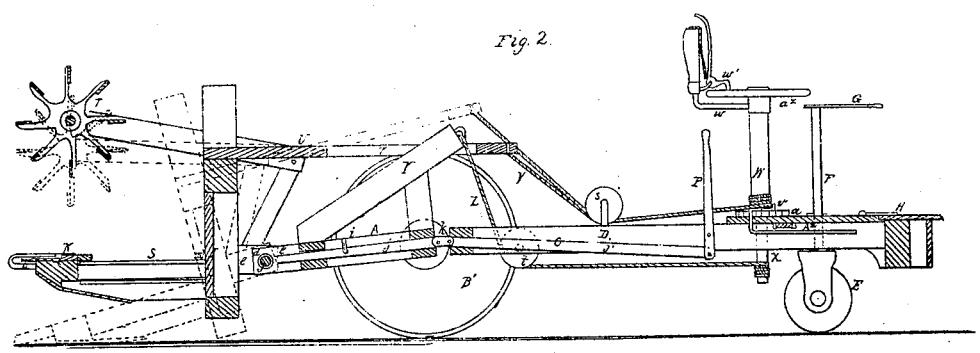

Figure 1 is a plan or top view of our invention; Fig. 2, a side sectional view of the same, taken in the line $x\,x$, Fig. 1.

Similar letters of reference indicate corresponding parts in the two figures.

This invention consists in a novel and useful combination of two frames and a draft-bar arranged in such a manner that the sickle and platform may be raised and lowered to any desired height, according to the height of cut required, and the sickle always kept in a proper horizontal position, and at the same time a very simple, economical, and efficient harvester obtained.

To enable those skilled in the art to fully understand and construct our invention, we will proceed to describe it.

A represents a rectangular frame, which is mounted on two wheels, B B', one of which, B, is the driving-wheel, and has pins $a$ in its periphery to prevent slipping, and has a bevel-wheel, C, attached concentrically to its inner side.

To the back part of the frame A a draft-bar, D, is attached, by joints or hinges $b\,b$, both of which are shown in Fig. 1, said joints or hinges being attached to a short cross-bar, $c$, at the front end of the draft-bar. The back part of the draft-bar is supported by a caster-wheel, E, the shaft or arbor F of which extends up through the draft-bar, and has a crank, G, attached to it. Directly behind this shaft or arbor F is the platform H for the driver.

To the front part of the frame A a frame, I, is connected by joints or hinges formed of tubes $d$, which pass through beams $e$ of the two frames, said tubes forming the pintles or pins of the joints. The tubes $d$ are employed for pintles in order to admit of a rod, J, passing through one or more of them, said rod being the pitman which drives the sickle K. Through the tube $d$, at the opposite side of the machine, a shaft, $f$, passes, which has a bevel-wheel, $g$, on its inner end and two pulleys, $h$ $h'$, on its opposite end. The bevel-wheel $g$ gears into a corresponding wheel, L, which is on the front end of a shaft, M, said shaft being placed longitudinally in the frame A, and having a bevel-wheel, N, upon it, which may be thrown in and out of gear with the wheel C by means of a shipper, $i$, which is connected to the hub of the wheel N, and is attached to a rod, O, which is composed of two parts, $j\,j'$, connected by a double or link joint, $k$, (see Fig. 2,) in order to admit of the frame A being raised and lowered, the rod O passing through the frame A, and arranged so that it may slide therein, so as to move the shipper $i$, and consequently the wheel N, the latter by this movement being thrown in and out of gear with the wheel C. The rod O is moved through the medium of a lever, P, attached to the back part of the draft-bar D, as shown clearly in Fig. 2.

The front end of the shaft M has a crank, $l$, attached to it, and this crank is connected to the pitman J by means of a link, Q. (Shown in Fig. 1.) The outer end of the pitman is attached to a lever, R, which has its fulcrum at $m$, and has its front end connected by a link, $n$, with the sickle K. The sickle is of the ordinary reciprocating kind, and works in fingers $o$, attached to the front end of the frame I. The platform S of the machine, on which the cut grain falls, is an endless apron which has a horizontal position on the frame I, but is inclined at one end, the inclined point projecting beyond the frame I. This apron works over suitable rollers, and is operated by means of a belt, $p$, from the pulley $h$ on the shaft $f$. T is a reel, which may be arranged in the usual way and operated by a belt, $g$, from the pulley $h'$.

To the back part of the frame I an arm, U, is attached. This arm has a slot, $r$, in it extending nearly its whole length, and to the outer end of said arm a cord, V, is attached, said cord passing under a pulley, $s$, on the draft-bar D, and having its end attached to a tube, W, which is fitted on a shaft, X, passing vertically through the draft-bar D. The frame A has a similar arm, Y, attached to it, said arm working or passing through the slot $r$ in the arm U, and having a cord, Z, attached to its end, said cord passing through the draft-bar D and under a pulley, $t$, therein, and having its end attached to the lower part of the shaft X. (See Fig. 2.) The shaft X has a ratchet, $u$, upon it, into which a pawl, $v$, attached to the draft-bar D, catches, and the upper end of the tube W is provided with a crank, $w$, having a catch, $w'$, attached to it, which engages with a hand-wheel, $a^x$, on the top of the shaft X. The cord Z is wound upon the shaft X in a direction opposite to that in which the cord V is wound on the tube W.

$A^x$ is the double-tree, attached to the back part of the draft-bar D, the team being behind the frame A.

The operation is as follows: As the machine is drawn along the sickle is operated from the wheel B through the medium of the gearing C M, crank $l$, link Q, pitman J, and lever R, the cut grain falling upon the endless apron S, and being discharged from the elevated end of the apron. The front end of the frame I, and consequently the sickle, may be raised by turning the tube W, and both frames may be raised by turning the shaft and tube simultaneously. This independent movement or adjustment of the two frames admits of the sickle being always retained in a horizontal position, for when the frame A is raised the frame I and sickle may be afterward adjusted to a horizontal position. This adjustment may be made when the machine is in motion, as the sickle-driving mechanism, owing to its arrangement, as shown, is not in the least affected by the adjustment of the two frames. The shaft X is retained in position by the ratchet and pawl $u$ $v$, and the tube W is retained in position by the catch $w$.

We do not claim the endless apron S, nor the reel T, nor the caster-wheel E, for they are old and well-known devices; but,

Having thus described our invention, what we do claim as new, and desire to secure by Letters Patent, is—

1. The two frames A I, connected together by the hinges or joints $d$, as shown, in connection with the draft-bar D, connected at its front end to the frame A by hinges or joints $b$ $b$, the two frames having arms U Y attached to them, which are connected by cords V Z to the shaft X and tube W, all arranged substantially as and for the purpose specified.

2. The tubular joints or pintles $d$ for connecting the two frames A I, in combination with the pitman J for driving the sickle K, when arranged, as shown, to admit of the adjustment of the two frames without interfering with the sickle-driving mechanism.

THOMAS WARD.
ISRAEL W. WARD.

Witnesses:
HENRY O. ROGERS,
CHARLES C. DANA.